United States Patent
Zhang et al.

(10) Patent No.: US 11,616,895 B2
(45) Date of Patent: Mar. 28, 2023

(54) METHOD AND APPARATUS FOR CONVERTING IMAGE DATA, AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yu Zhang, Beijing (CN); Xiuyun Chen, Beijing (CN); Zongze He, Beijing (CN); Feng Long, Beijing (CN); Pin Xiao, Beijing (CN); Yuxuan Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 356 days.

(21) Appl. No.: 16/957,463

(22) PCT Filed: Dec. 25, 2019

(86) PCT No.: PCT/CN2019/128281
§ 371 (c)(1),
(2) Date: Jun. 24, 2020

(87) PCT Pub. No.: WO2020/155954
PCT Pub. Date: Aug. 6, 2020

(65) Prior Publication Data
US 2021/0234991 A1    Jul. 29, 2021

(30) Foreign Application Priority Data
Jan. 30, 2019   (CN) .......................... 201910090714.9

(51) Int. Cl.
*G06F 3/12*        (2006.01)
*G06Q 20/12*       (2012.01)
(Continued)

(52) U.S. Cl.
CPC ......... *H04N 1/6016* (2013.01); *H04N 1/4078* (2013.01)

(58) Field of Classification Search
CPC combination set(s) only.
See application file for complete search history.

(56) References Cited

U.S. PATENT DOCUMENTS

2010/0329548 A1  12/2010  Yoshimura
2013/0194494 A1*  8/2013  Chun .................. G09G 3/2003
348/E7.003
(Continued)

FOREIGN PATENT DOCUMENTS

CN       1696977 A     11/2005
CN     105160300 A     12/2015
(Continued)

OTHER PUBLICATIONS

Second office action of Chinese application No. 201910090714.9 dated Dec. 22, 2020.
(Continued)

*Primary Examiner* — Helen Zong
(74) *Attorney, Agent, or Firm* — Lippes Mathias LLP (57) ABSTRACT

Disclosed is a method for converting image data. The method includes: acquiring image data of a target image, wherein the image data includes first pixel values of m pixels in the target image, each of the first pixel values includes a first color value of at least one color channel, the first color value being within a target color value interval of the at least one color channel; dividing the target color value interval into n color value partitions; determining a color value
(Continued)

partition where the first color value falls from the n color value partitions; and converting the first color value into a second color value according to a position of the first color value in the color value partition, the number of bits occupied by the second color value being less than the number of bits occupied by the first color value.

13 Claims, 7 Drawing Sheets

(51) Int. Cl.
  *G06Q 20/32* (2012.01)
  *H04N 1/60* (2006.01)
  *H04N 1/407* (2006.01)

(56) References Cited

U.S. PATENT DOCUMENTS

| | | | |
|---|---|---|---|
| 2017/0054984 A1 | 2/2017 | Park et al. | |
| 2018/0090051 A1* | 3/2018 | Park | G09G 5/026 |
| 2018/0247396 A1 | 8/2018 | Pouli et al. | |
| 2019/0028722 A1* | 1/2019 | Choi | G06T 3/4015 |

FOREIGN PATENT DOCUMENTS

| | | |
|---|---|---|
| CN | 106256126 A | 12/2016 |
| CN | 106791852 A | 5/2017 |
| CN | 107862671 A | 3/2018 |
| CN | 107949864 A | 4/2018 |
| CN | 108074220 A | 5/2018 |
| CN | 108257179 A | 7/2018 |
| CN | 109754443 A | 5/2019 |

OTHER PUBLICATIONS

International search report of PCT application No. PCT/CN2019/128281 dated Mar. 18, 2020.
First office action of Chinese application No. 201910090714.9 dated Jun. 18, 2020.
Hailong Liu, Adaptive Local Contrast Enhancement Based Tone Mapping for High Dynamic Range Images; Chinese Master's Thesises Full-text Database Information Science and Technology; Mar. 15, 2017, abstract, pp. 13-25, 52.

* cited by examiner

METHOD AND APPARATUS FOR CONVERTING IMAGE DATA, AND STORAGE MEDIUM

CROSS REFERENCE TO RELATED APPLICATION

The present disclosure is a 371 of PCT/CN2019/128281, filed on Dec. 25, 2019, which claims priority to Chinese Patent Application No. 201910090714.9, filed on Wednesday, Jan. 30, 2019, and entitled "METHOD AND APPARATUS FOR CONVERTING IMAGE DATA, AND STORAGE MEDIUM", the entire contents of which are incorporated herein by reference.

TECHNICAL FIELD

The present disclosure relates to the field of image processing, and in particular, to a method and an apparatus for converting image data, and a storage medium.

BACKGROUND

In actual application, different images may have different color bits. The number of bits occupied by the color values of pixels in an image is different in different color bits.

SUMMARY

Embodiments of the present disclosure provide a method and an apparatus for converting image data, and a storage medium.

At least one embodiment of the present disclosure provides a method for converting image data. The method includes:

acquiring image data of a target image, wherein the image data includes first pixel values of m pixels in the target image, each of the first pixel values includes a first color value of at least one color channel, the first color value being within a target color value interval of the at least one color channel, and m being a positive integer;

dividing the target color value interval into n color value partitions, n being a positive integer greater than 1;

determining a color value partition where the first color value falls from the n color value partitions, and converting the first color value into a second color value according to a position of the first color value in the color value partition, the number of bits occupied by the second color value being less than the number of bits occupied by the first color value.

Optionally, converting the first color value into the second color value according to the position of the first color value in the color value sub-interval includes:

dividing the color value partition where the first color value falls into h color value sub-intervals, each of the color value sub-intervals corresponding to one second color value, and h being a positive integer greater than 1;

determining a target color value sub-interval in the h color value sub-intervals, the target color value sub-interval being a color value sub-interval where the first color value falls;

acquiring the second color value corresponding to the target color value sub-interval as the second color value converted from the first color value.

Optionally, both the first color value and the second color value are a binary value;

The number h of color value sub-intervals divided between the one color value partition where the first color value falls satisfies a first formula, wherein the first formula is $h=2^k$, k being the number of bits occupied by the second color value.

Optionally, dividing the color value partition where the first color value falls into the h color value sub-intervals includes:

dividing evenly the color value partition where the first color value falls into the h color value sub-intervals.

Optionally, dividing the target color value interval into the n color value partitions includes:

determining n−1 gray-scale transition boundaries in the target image according to the image data, a difference between the first color value of the pixel on one side of each of the gray-scale transition boundaries and the first color value of the pixel on the other side of each of the gray-scale transition boundaries being greater than a target difference threshold;

determining n−1 target endpoints according to the first color value of the pixel contained in each of the gray-scale transition boundaries;

dividing the target color value interval into the n color value partitions according to the n−1 target endpoints, each of the target endpoints being an endpoint of the color value partition.

Optionally, determining the n−1 gray-scale transition boundaries in the target image according to the image data includes:

determining a boundary of a circular image as the gray-scale transition boundary when determining that the target image includes the circular image according to the image data.

Optionally, the number of bits occupied by the first color value is equal to 8, and the number of bits occupied by the second color value is equal to 2.

At least one embodiment of the present disclosure provides an apparatus for converting image data. The apparatus includes:

an acquiring module, configured to acquire image data of a target image, wherein the image data includes first pixel values of m pixels in the target image, each of the first pixel values includes a first color value of at least one color channel, the first color value being within a target color value interval of the at least one color channel, and m being a positive integer;

a dividing module, configured to divide the target color value interval into n color value partitions, n being a positive integer greater than 1;

a converting module, configured to determine a color value partition where the first color value falls from the n color value partitions, and convert the first color value into a second color value according to a position of the first color value in the color value partition, the number of bits occupied by the second color value being less than the number of bits occupied by the first color value.

Optionally, the converting module is configured to:

divide the color value partition where the first color value falls into h color value sub-intervals, each of the color value sub-intervals corresponding to one second color value, and h being a positive integer greater than 1;

determine a target color value sub-interval in the h color value sub-intervals, the target color value sub-interval being a color value sub-interval where the first color value falls;

acquire the second color value corresponding to the target color value sub-interval as the second color value converted from the first color value.

Optionally, both the first color value and the second color value are a binary value;

The number h of color value sub-intervals divided between the one color value partition where the first color value falls satisfies a first formula, and the first formula is $h=2^k$, k being the number of bits occupied by the second color value.

Optionally, the converting module is configured to:

divide evenly the color value partition where the first color value falls into the h color value sub-intervals.

Optionally, the dividing module is configured to:

determine n−1 gray-scale transition boundaries in the target image according to the image data, a difference between the first color value of the pixel on one side of each of the gray-scale transition boundaries and the first color value of the pixel on the other side of each of the gray-scale transition boundaries being greater than a target difference threshold;

determine n−1 target endpoints according to the first color value of the pixel contained in each of the gray-scale transition boundaries;

divide the target color value interval into the n color value partitions according to the n−1 target endpoints, each of the target endpoints being an endpoint of the color value partition.

Optionally, the dividing module is configured to:

determine a boundary of a circular image as the gray-scale transition boundary when it is determined that the target image includes the circular image according to the image data.

Optionally, the number of bits occupied by the first color value is equal to 8, and the number of bits occupied by the second color value is equal to 2.

At least one embodiment of the present disclosure provides a device for use in converting image data. The device includes a processor; and a memory configured to store at least one computer program;

the processor is configured to execute the at least one computer program stored in the memory to perform the method for converting image data as described above.

Optionally, the device further includes a display unit, the display unit including m pixel units;

wherein each of the pixel units includes a memory, the memory included by each of the pixel units being configured to store at least one second pixel value required for display by each of the pixel units, and the second pixel value including a second color value of at least one color channel, m being a positive integer.

At least one embodiment of the present disclosure provides a computer-readable storage medium storing at least one computer instruction therein, wherein the at least one computer program, when being executed by a processor, enables the processor to perform the method for converting image data as described above.

DETAILED DESCRIPTION

For clearer descriptions of the objects, technical solutions and advantages of the present disclosure, embodiments of the present disclosure are described in further detail with reference to the accompanying drawings.

Generally, different images may have different number of color bits, and the higher the number of color bits, the greater the amount of image data.

In actual applications, different images may have different color bits, among which 24-bit, 16-bit and 8-bit are several common color bits. The number of bits occupied by the color values of pixels in an image is different in different color bits. For example, in an image with the color bit of 24-bit, the color values of each pixel under the three color channels of RGB (red, green and blue) all occupy 8 bits; in an image with the color bit of 16-bit, the color value of each pixel under the R color channel occupies 5 bits, the color value under the G color channel occupies 6 bits, and the color value under the B color channel occupies 5 bits. Some display devices are not able to display images with a higher number of color bits. For example, MIP (Memory In Pixel) display devices generally only display images with a color bit of 6-bit, this is because a pixel unit may include a memory in the MIP display device, and the MIP display device may write at least one pixel value to be displayed by the pixel unit into the memory included in the pixel unit. The pixel unit sequentially reads and displays the at least one pixel value stored in the memory. Since the amount of data that can be stored in the memory is small, the amount of data of the pixel value that the MIP display device writes to the memory may not be too large, such that the MIP display devices may generally only display images with lower color bits. Thus, normally, the MIP display devices can only display images with a color bit of 6-bit.

From above descriptions, it can be seen that in most cases, for some images with a higher color bit number, the image data of the image has to be converted to reduce the color bit number of the image, thereby reducing the data amount of the image, or ensuring that the display device may display the image.

At present, how to convert the image data of an image with a higher color bit number to reduce the color bit number of the image has become an urgent problem to be solved.

An embodiment of the present disclosure provides a method and an apparatus for converting image data, and a storage medium, which may realize the conversion of an image with a higher color bit number into an image with a lower color bit number.

In the method for converting image data according to the embodiment of the present disclosure, the display device may acquire image data of a target image, wherein the image data includes first pixel values of m pixels in the target image, the first pixel value including a first color value of at least one color channel, the first color value being within a target color value interval of the at least one color channel, and m being a positive integer; then, the display device divides the target color value interval into n color value partitions; subsequently, the display device determines a color value partition where the first color value falls from the n color value partitions, and converts the first color value into a second color value according to a position of the first color value in the color value partition, the number of bits occupied by the second color value being less than the number of bits occupied by the first color value, so as to realize the conversion of an image with a higher color bit number into an image with a lower color bit number.

Figure 1:
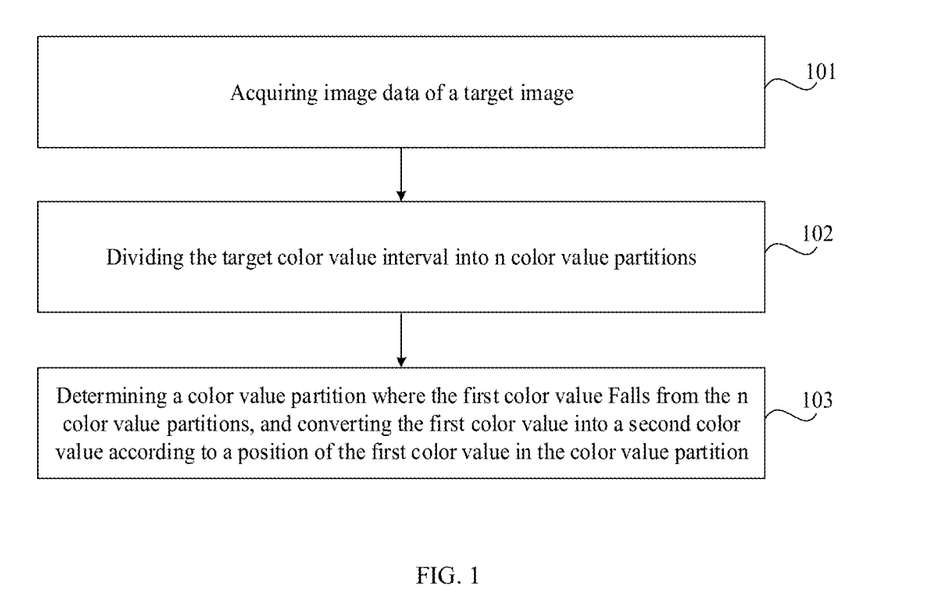
FIG. 1 is a schematic flowchart of a method for converting image data according to an embodiment of the present disclosure.

FIG. 1 is a schematic flowchart of a method for converting image data according to an embodiment of the present disclosure. The method for converting image data may be applicable to a display device, wherein the display device may be a display screen, or an electronic device equipped with a display screen, such as a TV or a tablet. In some possible embodiments, the display device may be an MIP display device, i.e., the display device may be an MIP display screen, or the display device may be an electronic device provided with an MIP display screen. As shown in FIG. 1, the method for converting image data may include following steps.

In step 101, the display device acquires image data of a target image.

Among them, the image data includes first pixel values of m pixels in the target image, each of the first pixel values includes a first color value of at least one color channel, the first color value is within a target color value interval of the at least one color channel, and m is a positive integer.

In step 102, the display device divides the target color value interval into n color value partitions.

In this step, n is a positive integer greater than 1.

In step 103, the display device determines a color value partition where the first color value falls from the n color value partitions, and converts the first color value into a second color value according to a position of the first color value in the color value partition.

Among them, the number of bits occupied by the second color value is less than the number of bits occupied by the first color value.

In summary, in the method for converting image data according to the embodiment of the present disclosure, image data of a target image is acquired, wherein the image data includes first pixel values of m pixels in the target image, the first pixel value including a first color value of at least one color channel, the first color value being within a target color value interval of the at least one color channel, and m being a positive integer; then the target color value interval is divided into n color value partitions, and subsequently a color value partition where the first color value falls is determined from the n color value partitions; and the first color value is converted into a second color value according to a position of the first color value in the color value partition, wherein the number of bits occupied by the second color value is less than the number of bits occupied by the first color value. In this way, the conversion of an image with a higher color bit number into an image with a lower color bit number may be realized.

Figure 2:
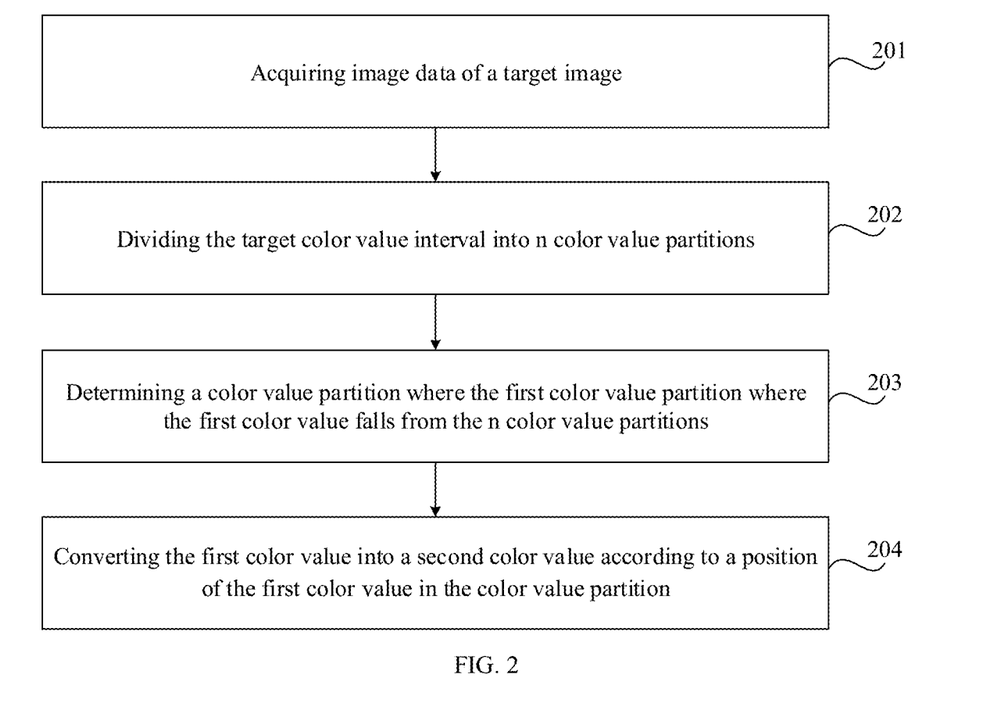
FIG. 2 is a schematic flowchart of another method for converting image data according to an embodiment of the present disclosure.

FIG. 2 is a schematic flowchart of a method for converting image data according to an embodiment of the present disclosure. The method for converting image data may be applicable to a display device, wherein the display device may be a display screen, or an electronic device equipped with a display screen, such as a TV or a tablet. In some possible embodiments, the display device may be an MIP display device, that is to say, the display device may be an MIP display screen, or the display device may be an electronic device equipped with an MIP display screen. As shown in FIG. 2, the method for converting image data may include following steps.

In step 201, the display device acquires image data of a target image.

The target image is an image with a higher number of color bits. For example, the target image may be a bmp (English: Bitmap) format image with 24 color bits. In some possible embodiments, the target image may be a frame in a video.

In subsequent steps, the display device may convert the image data of the target image to reduce the number of color bits of the target image.

When the method for converting image data according to the embodiment of the present disclosure is applied in the MIP display device, the MIP display device may reduce the number of color bits of the target image to 6-bit in subsequent steps to enable the MIP display device to display the target image normally.

In step 201, the image data of the target image acquired by the display device may include the first pixel values of m pixels in the target image. In some possible embodiments, the "m pixels in the target image" refers to, possibly, all pixels included in the target image, that is, in these embodiments, the number of the all pixels included in the target image is m.

The first pixel value of each pixel may include a first color value of q (q is a positive integer) color channels. In some possible embodiments, the first pixel value may include the first color values of 3 color channels (i.e., q=3). The three color channels are R (red) color channel, G (green) color channel, and B (blue) color channel.

When the number of color bits of the target image is 24, the first color values of the R (red) color channel, G (green) color channel and B (blue) color channel all occupy 8 bits.

The first color value falls in the target color value interval of the q color channels, wherein the endpoints of the target color value interval of the q color channels are the minimum value that may be taken by the first color value and the maximum value that may be taken by the first color value.

For example, in the case where the number of color bits of the target image is 24, the first color value occupies 8 bits, wherein the minimum value that it may take is 0 (the 8 bits occupied by the first color value are all 0), and the maximum value that it may take is 255 (the 8 bits occupied by the first color value are all 1). In this case, the endpoints of the target color value interval are 0 and 255, that is to say, the target color value interval is [0, 255].

In step 202, the display device divides the target color value interval into n color value partitions.

In an embodiment of the present disclosure, the display device may divide the target color value interval into n color value partitions according to the acquired image data of the target image, wherein n is a positive integer greater than 1.

In the following description, as an embodiment of the present disclosure, step 202 will be described by taking the technical process of the display device dividing the target color value interval [0, 255] into n color value partitions as an example, and the technical process of the display device dividing other target color value intervals into n color value partitions is the same, which will not be repeated in the embodiment of the disclosure.

The technical process of the display device dividing the target color value interval into n color value partitions may include following 3 steps.

In step a1, the display device determines n−1 gray-scale transition boundaries in the target image according to the image data of the target image.

A difference between the first color value of the pixel on one side of each of the gray-scale transition boundaries and the first color value of the pixel on the other side of each of the gray-scale transition boundaries is greater than a target difference threshold.

The so-called "the first color value of the pixel on one side of each of the gray-scale transition boundaries" may refer to the first color value of a certain color channel or an average of the first color values of a certain number of color channels of a pixel in a target area on one side of the gray-scale transition boundary.

Similarly, "the first color value of the pixel on the other side of each of the gray-scale transition boundaries" may refer to the first color value of a certain color channel or an average of the first color values of a certain number of color channels of a pixel in a target area on the other side of the gray-scale transition boundary.

It should be noted that the target difference threshold may be set by a technician in advance, which is not limited in the embodiments of the present disclosure.

Figure 3:
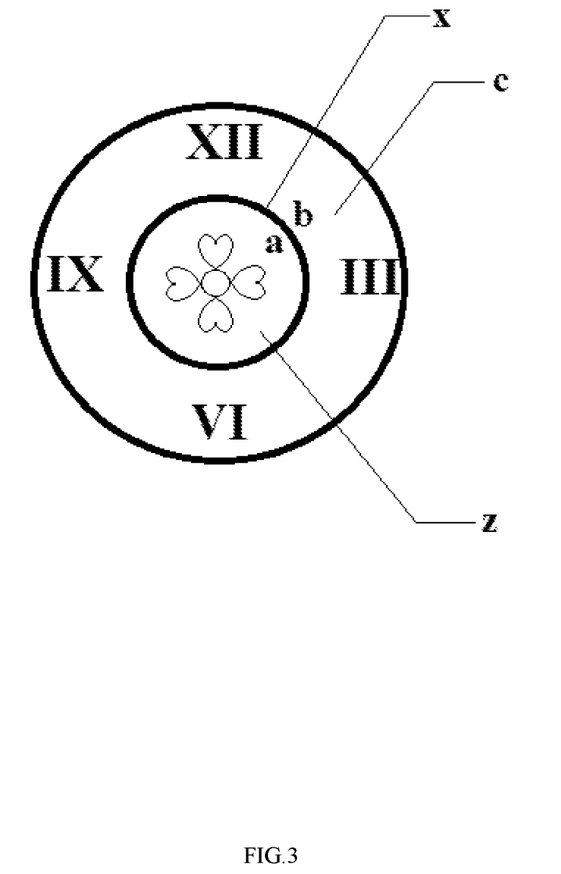
FIG. 3 is a schematic diagram of a target image according to an embodiment of the present disclosure.

With reference to FIG. 3, FIG. 3 is a schematic diagram of an target image. As shown in FIG. 3, the difference between the first color value of the pixel on one side a of the boundary x and the first color value of the pixel on the other side b of the boundary x is greater than the target difference threshold. Therefore, the boundary x is the gray-scale transition boundary in the target image.

In a possible embodiment, the display device may determine a boundary of a circular image as the gray-scale transition boundary when determining that the target image includes the circular image according to the image data of the target image.

With continuous reference to FIG. 3, as shown in FIG. 3, the target image includes a circular image c, and the display device may determine the boundary x of the circular image c as the gray-scale transition boundary in the target image.

In step a2, the display device determines n−1 target endpoints according to the first color value of the pixel contained in each of the gray-scale transition boundaries.

In a possible embodiment, for each of the gray-scale transition boundaries, the display device may determine the average of the first color values of a certain color channel (for example, the color channel may be an R color channel) of pixels included in the gray-scale transition boundary as the target endpoint.

In another possible embodiment, for each of the gray-scale transition boundaries, the display device may determine the first color value of a certain color channel (for example, the color channel may be an R color channel) of one pixel included in the gray-scale transition boundary as the target endpoint.

Taking the target image shown in FIG. 3 as an example, in a possible embodiment, the display device may acquire an average of the first color values of the R color channels of all pixels included in the boundary x, and determine the average as the target endpoint. For example, if the boundary x includes 1000 pixels and the first color values of the R color channels of the 1000 pixels are r1, r2, r3, . . . , r1000, then the target endpoint may be (r1+r2+r3+ . . . +r1000)/1000.

In another possible embodiment, the display device may select one pixel from the plurality of pixels included in the boundary x, and determine the first color value of the R color channel of the pixel as the target endpoint. For example, the first color value of the R color channel of the pixel selected by the display device from the boundary x may be rn, then the target endpoint is rn.

In step a3, the display device divides the target color value interval into n color value partitions according to the n−1 target endpoints, wherein each of the target endpoints is an endpoint of the color value partition.

Taking the target image shown in FIG. 3 as an example, the number of the gray-scale transition boundaries (i.e., boundary x) is 1, and the number of target endpoints is also 1, that is, n is 2. Therefore, the display device may divide the target color value interval into 2 color value partitions. When the number of color bits of the target image is 24, the target color value interval is [0, 255]; assuming the target endpoint is rn, the two color value partitions are [0, rn] and (rn, 255), respectively.

In step 203, the display device determines a color value partition where the first color value falls from the n color value partitions.

Taking the target image shown in FIG. 3 as an example, if the first color value of the R color channel of one pixel of the target image is rc, wherein rc is greater than 0 and less than rn, then the color value partition where the first color value rc falls is [0, rn].

In step 204, the display device converts the first color value into a second color value according to a position of the first color value in the color value partition.

The technical process of the display device converting the first color value into a second color value may include following three steps.

In step b1, the display device divides the color value partition where the first color value falls into h color value sub-intervals.

Each of the color value sub-intervals corresponds to one second color value, and h is a positive integer greater than 1.

Taking the target image shown in FIG. 3 as an example, if it is assumed that the first color value is rc, then the color value partition where it falls is [0, rn]. In step b1, the display device may divide the color value partition [0, rn] into h color value sub-intervals, wherein each of the color value sub-intervals corresponds to the one second color value.

In the case where the second color value is a binary value, if the second color value occupies k bits, then the second color value may have $2^k$ values. Since each of the sub-intervals of color values obtained by division corresponds to one second color value, the number h of the color value sub-intervals obtained by the division satisfies a first formula, and the first formula is $h=2^k$.

Still, taking the target image shown in FIG. 3 as an example, if the display device is required to reduce the number of color bits of the target image from 24 bits to 6 bits, the number of bits occupied by the second color value is 2. Therefore, the display device has to divide the color value partition [0, rn] into 4 ($2^2$) color value sub-intervals, and the 4 color value sub-intervals are [0, re], (re, rf], (rf, rg] and (rg, rn], respectively, wherein each of the color value sub-intervals corresponds to one second color value. For example, [0, re] corresponds to the second color value 0, (re, rf] corresponds to the second color value 1, rg] corresponds to the second color value 2, and (rg, rn] corresponds to the second color value 3.

In a possible embodiment, the display device may divide evenly the color value partition into the h color value sub-intervals.

It should be noted that when the first color value is converted into the second color value, the display device may have already performed the technical process of dividing the color value partition where the first color value falls into the h color value sub-intervals.

If the display device has already performed the technical process of dividing the color value partition where the first color value falls into the h color value sub-intervals when the first color value is converted into the second color value, the display device may not perform step b1.

In step b2, the display device determines a target color value sub-interval in the h color value sub-intervals.

The target color value sub-interval is a color value sub-interval where the first color value falls.

Still, taking the target image shown in FIG. 3 as an example, assuming that the first color value is rc, the display device divides the color value partition [0, rn] into 4 color value sub-intervals, and the 4 color value sub-intervals are [0, re], (re, rf], (rf, rg] and (rg, rn], respectively. Since rc is greater than 0 and less than re, the first color value falls in the color value sub-interval [0, re], then the display device may determine the color value sub-interval [0, re] as the target color value sub-interval.

In step b3, the display device acquires the second color value corresponding to the target color value sub-interval as the second color value converted from the first color value.

Still, taking the target image shown in FIG. 3 as an example, the display device may acquire the second color value corresponding to the target color value sub-interval. As in the above example, the second color value may be 0, and the display device may convert the first color value into the second color value 0.

According to the above description, in the embodiment of the present disclosure, the display device may divide the target color value interval twice, wherein the first division is to divide the target color value interval into n color value partitions, and the second division is to divide the target color value partition into h color value sub-intervals. The display device may convert the first color value into the second color value according to the result of the two divisions.

Compared with the method of dividing the target color value interval, by converting the first color value into the second color value according to the result from this division, the method of dividing the target color value interval twice and converting the first color value into the second color value according to the result of the two divisions may reduce the number of color bits of the target image while retaining more information and details in the target image.

Figure 4:
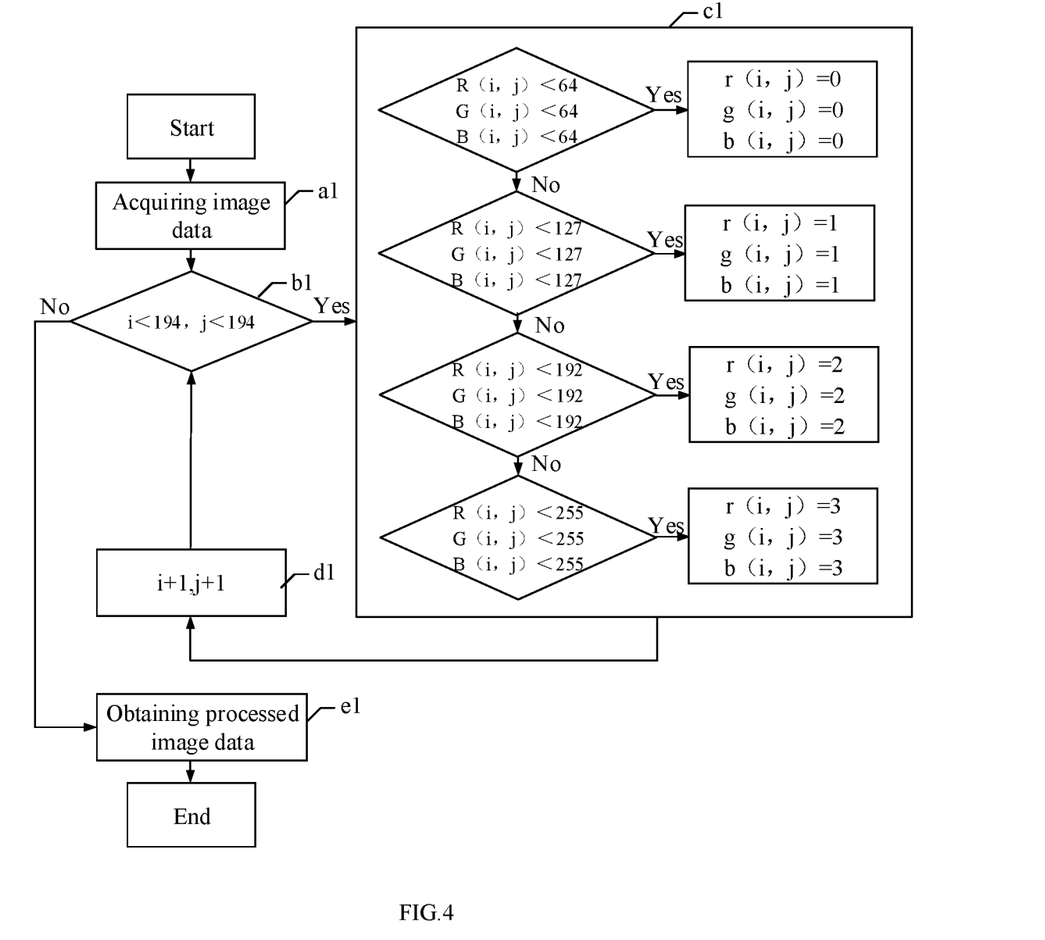
FIG. 4 is a schematic flowchart of converting a first color value into a second color value according to an embodiment of the present disclosure.

As shown in FIG. 4, if the target image includes 194*194 pixels, the target image is a 24-bit image, and each of the first pixel values of the target image includes the first color values of 3 color channels, and the three color channels are R color channel, G color channel and B color channel. The display device may perform the technical process of steps a1 to e1 in the case of dividing the target color value interval once.

In step a1, the display device may acquire image data of the target image, the image data including 194*194*3 first color values. Each of the first color values may be expressed in the form of T (i, j), wherein T is the type of the color channel, the pixel to which the first color value belongs is in the $i^{th}$ pixel row and the $j^{th}$ pixel column. For example, R (3, 4) refers to the first color value of the R color channel of the pixel located in the third pixel row and the fourth pixel column.

In step b1 to step e1, the display device acquires each of the first color values in turn, and determines the color value sub-interval where the acquired first color value falls in the four color value partitions, acquires the second color value corresponding to the color value sub-interval where the acquired first color value falls as the second color value converted from the first color value, so as to obtain the processed image data. The four color value partitions are [0, 64], (64, 127], (127, 192] and (192, 255], wherein the second color value r (i, j) corresponding to the color value partition [0, 64] is 0, the second color value r (i, j) corresponding to the color value partition (64, 127] is 1, the second color value r (i, j) corresponding to the color value partition (127, 192] is 2, and the second color value r (i, j) corresponding to the color value partition (192, 255] is 3.

For example, the first color value of the R color channel of one pixel in the target image is 244, and the color value partition where it falls is (192, 255] while the second color value corresponding to the color value partition being 3, then the display device may convert the first color value 244 to a second color value of 3 according to steps b1 to e1 in FIG. 4.

With reference to FIG. 3, since the first color values of the pixels in the middle area Z of the circular image c are larger, most of the first color value of the pixels in the middle area Z will be converted into the second color value 3 in the case of dividing the target color value interval of each color channel only once, such that much of the information and details in the middle area Z are lost.

Figure 5:
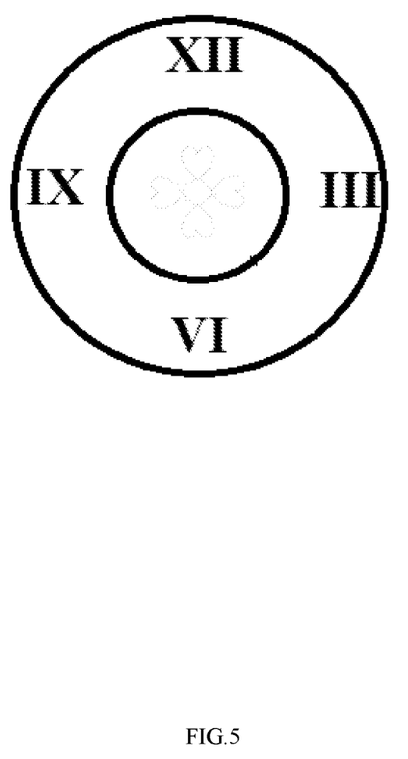
FIG. 5 is a schematic diagram of a target image according to an embodiment of the present disclosure.

With reference to FIG. 5, FIG. 5 is a schematic diagram of an image with a lower number of color bits obtained by the above conversion method for the target image shown in FIG. 3. In FIG. 5, the pattern image in the middle area Z is relatively blurry and difficult to see, i.e., much information and details in the middle area Z are lost.

Figure 6:
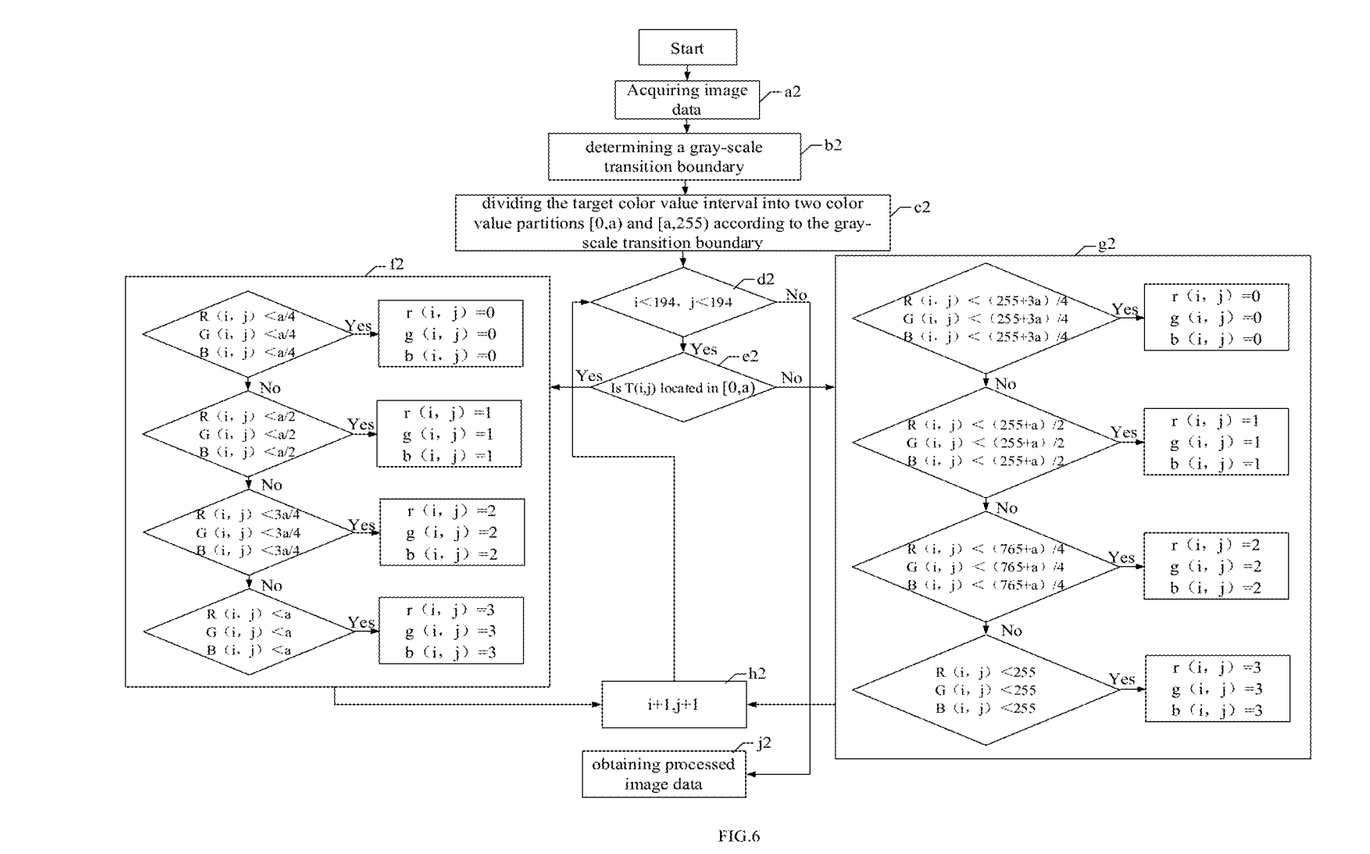
FIG. 6 is a schematic flowchart of converting a first color value into a second color value according to an embodiment of the present disclosure.

As shown in FIG. 6, if the target image includes 194*194 pixels, the target image is a 24-bit image, and each of the first pixel values of the target image includes the first color values of 3 color channels, and if the three color channels are R color channel, G color channel and B color channel, then the display device may perform the technical process of steps a2 to j2 in the case of dividing the target color value interval twice.

In step a2, the display device may acquire image data of the target image, the image data including 194*194*3 first color values. In step b2, the display device may acquire the gray-scale transition boundary in the target image. For example, in FIG. 6, the number of the gray-scale transition boundary acquired by the display device is 1. In step c2, the display device may divide the target color value interval [0, 255] into two color value partitions according to the gray-scale transition boundary. In step d2 to step j2, the display device acquires each of the first color values of each color channel in turn, and determines the color value partition where the acquired first color value is falls in the two color value partitions [0, a) and [a, 255]; then in the color value partition where the first color value falls, the display device acquires the color value sub-interval where the first color value falls, as shown in FIG. 6, each of the color value partitions includes 4 color value sub-intervals; subsequently, the display device acquires the second color value corresponding to the color value sub-interval where the acquired first color value falls as the second color value converted from the first color value.

For example, the first color value of the R color channel of one pixel in the target image is 244, and the color value partition where the first color value falls is [a, 255]. In the color value partition, the second color value corresponding to the color value sub-interval where the first color value 244 falls is 3, then the display device may convert the first color value 244 to the second color value 3 according to steps d2 to j2 in FIG. 6.

Similarly, taking the target image shown in FIG. 3 as an example, in the case of dividing the target color value interval of each color channel twice, since the middle area Z is exactly on one side of the boundary x (i.e., the gray-scale transition boundary), the first color value of each color channel of the pixels in the middle are Z falls in a certain color value partition that divides the target color value interval of the color channel for the first time; then, the display device may divide the color value partition for the second time to obtain h color value sub-intervals, and the display device may convert the first color value to the second color value according to the color value sub-interval where the first color value falls, such that much of the information and details in the middle area Z may be retained.

Figure 7:
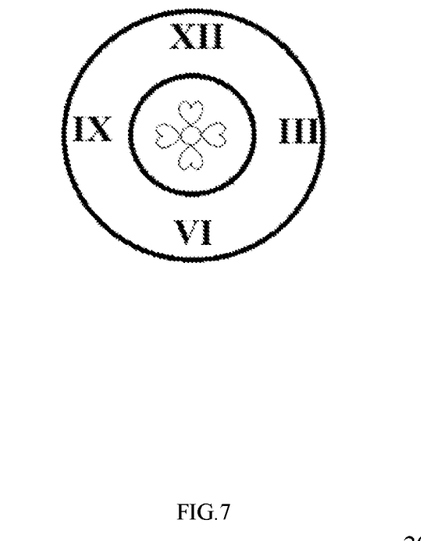
FIG. 7 is a schematic diagram of a target image according to an embodiment of the present disclosure.

With reference to FIG. 7, FIG. 7 is a schematic diagram of an image with a lower number of color bits obtained by the above conversion method for the target image shown in FIG. 3. In FIG. 7, the pattern image in the middle area Z is relatively clear, that is to say, much information and details in the middle area Z are retained.

In summary, in the method for converting image data according to the embodiment of the present disclosure, image data of a target image is acquired, wherein the image data includes first pixel values of m pixels in the target image, the first pixel value including a first color value of at least one color channel, the first color value being within a target color value interval of the at least one color channel, and m being a positive integer; then the target color value interval is divided into n color value partitions, and subsequently a color value partition where the first color value falls is determined from the n color value partitions; and the first color value is converted into a second color value according to a position of the first color value in the color value partition, wherein the number of bits occupied by the second color value is less than the number of bits occupied by the first color value. In this way, the conversion of an image with a higher color bit number into an image with a lower color bit number may be realized.

Figure 8:
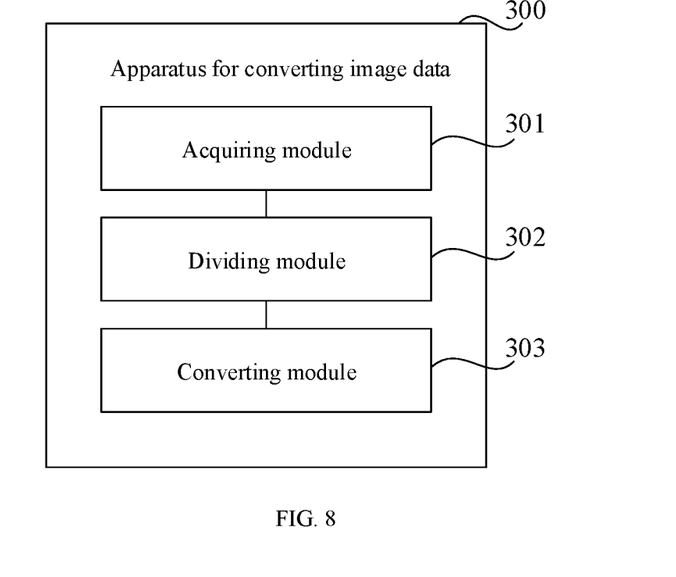
FIG. 8 is a schematic block diagram of an apparatus for converting image data according to an embodiment of the present disclosure.

FIG. 8 is a schematic block diagram of an apparatus 300 for converting image data according to an embodiment of the present disclosure. The apparatus 300 for converting image data is applicable to a display device, wherein the display device may be a display screen, or an electronic device equipped with a display screen, such as a TV or a tablet. In some possible embodiments, the display device may be an MIP display device, i.e., the display device may be an MIP display screen, or the display device may be an electronic device equipped with an MIP display screen. As shown in FIG. 8, the apparatus 300 for converting image data includes an acquiring module 301, a dividing module 302 and a converting module 303.

The acquiring module 301 is configured to acquire image data of a target image, wherein the image data includes first pixel values of m pixels in the target image, each of the first pixel values including a first color value of at least one color channel, the first color value being within a target color value interval of the at least one color channel, and m being a positive integer.

The dividing module 302 is configured to divide the target color value interval into n color value partitions, wherein n is a positive integer greater than 1.

The converting module 303 is configured to determine a color value partition where the first color value falls from the n color value partitions, and converting the first color value into a second color value according to a position of the first color value in the color value partition, wherein the number of bits occupied by the second color value is less than the number of bits occupied by the first color value.

In an embodiment of the present disclosure, the converting module 303 is configured to divide the color value partition where the first color value falls into h color value sub-intervals, each of the color value sub-intervals corresponding to one second color value, and h being a positive integer greater than 1; to determine a target color value sub-interval in the h color value sub-intervals, the target color value sub-interval being a color value sub-interval where the first color value falls; to acquire a second color value corresponding to the target color value sub-interval as the second color value converted from the first color value.

In an embodiment of the present disclosure, both the first color value and the second color value are binary values; the number h of color value sub-intervals divided between the one color value partition where the first color value falls satisfies a first formula, wherein the first formula is $h=2^k$, k being the number of bits occupied by the second color value.

In an embodiment of the present disclosure, the converting module 303 is configured to divide evenly the color value partition where the first color value falls into the h color value sub-intervals.

In an embodiment of the present disclosure, the dividing module 302 is configured to determine n−1 gray-scale transition boundaries in the target image according to the image data, a difference between the first color value of the pixel on one side of each of the gray-scale transition boundaries and the first color value of the pixel on the other side of each of the gray-scale transition boundaries being greater than a target difference threshold; to determine n−1 target endpoints according to the first color value of the pixel contained in each of the gray-scale transition boundaries; to divide the target color value interval into n color value partitions according to the n−1 target endpoints, each of the target endpoints being an endpoint of the color value partition.

In an embodiment of the present disclosure, the dividing module 302 is configured to determine a boundary of a circular image as the gray-scale transition boundary when determining that the target image includes the circular image according to the image data.

In an embodiment of the present disclosure, the number of bits occupied by the first color value is equal to 8, and the number of bits occupied by the second color value is equal to 2.

In summary, in the apparatus for converting image data according to the embodiment of the present disclosure, image data of a target image is acquired, wherein the image data includes first pixel values of m pixels in the target image, the first pixel value including a first color value of at least one color channel, the first color value being within a target color value interval of the at least one color channel; then the target color value interval is divided into n color value partitions, and subsequently a color value partition where the first color value falls is determined from the n color value partitions; and the first color value is converted into a second color value according to a position of the first color value in the color value partition, wherein the number of bits occupied by the second color value is less than the number of bits occupied by the first color value. In this way, the conversion of an image with a higher color bit number into an image with a lower color bit number may be realized.

It is to be noted that the apparatus for converting image data according to the above-described embodiments are only examples described by the division of the functional modules described above when the operation control is performed. In practice application, the functions can be completed by distributing to different functions modules, that is, the internal structure of the device is divided into different functional modules to complete all or a part of the functions described above. In addition, the method and apparatus for converting image data provided in the embodiments described above belong to the same inventive concept, and the detailed description thereof will be omitted.

Figure 9:
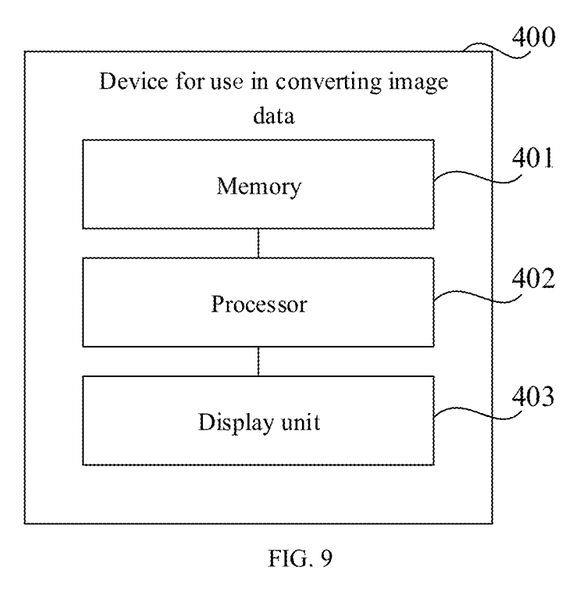
FIG. 9 is a schematic block diagram of a device for use in converting image data according to an embodiment of the present disclosure.

As shown in FIG. 9, an embodiment of the present disclosure further provides an device 400 for use in converting image data. The device 400 may be configured to execute the technical process performed by the display device in the method for converting image data provided in the foregoing embodiments. With reference to FIG. 9, device 400 includes a memory 401, a processor 402 and a display unit 403. Those skilled in the art may understand that the structure of the device 400 shown in FIG. 9 does not constitute a limitation to the device 400, and may include more or fewer components than those shown in the figure, or some components are combined, or different component arrangements are used in actual applications.

The memory 401 may be configured to store computer programs and modules, and the memory 401 may mainly include a program storage area and a data storage area, wherein the program storage area may store applications and so on required by the operating system and at least one function. The memory 401 may include a high random access memory and may further include non-volatile memories, such as at least one disk memory device, flash memory device, or other volatile solid-state memory devices. Accordingly, the memory 401 may further include a memory controller to provide access of the processor 402 to the memory 401.

The processor 402 performs a variety of function applications and data processing by running the software programs and modules stored in the memory 401.

The display unit 403 is configured to display images. The display unit 403 may include a display panel which, optionally, may be configured with liquid crystal display (LCD), organic light-emitting diode (OLED) and other forms.

The display unit 403 includes m pixel units, wherein each of the pixel units includes a memory, the memory included in each of the pixel units is configured to store at least one second pixel value required for display by each of the pixel units, and the second pixel value includes second color values of q color channels, q and m being positive integers.

In an illustrative embodiment, a computer-readable storage medium is further provided. The computer-readable storage medium is a non-volatile storage medium, and the computer-readable storage medium stores at least one computer program. The at least one computer program, when being executed by a processor, enables the processor to perform the method for converting image data according to the embodiments of the present disclosure.

In an illustrative embodiment, a computer program product is further provided. The computer program product stores at least one instruction, which when running on a computer, enables the computer to perform the method for converting image data according to the embodiments of the present disclosure.

In an illustrative embodiment, a chip is further provided. The chip includes programmable logic circuits and/or program instructions, and when the chip is running, it may execute the method for converting image data according to the embodiments of the present disclosure.

Persons of ordinary skill in the art can understand that all or part of the steps described in the above embodiments can be completed through hardware, or through relevant hardware instructed by applications stored in a computer-readable storage medium, such as a read-only memory, a disk or a CD, or the like.

Described above are merely exemplary embodiments of the present disclosure, and are not intended to limit the present disclosure. Within the spirit and principles of the present disclosure, any modifications, equivalent substitutions, improvements, or the like are within the protection scope of the present disclosure.

What is claimed is:

1. A method for converting image data, comprising:
   acquiring image data of a target image, wherein the image data comprises first pixel values of m pixels in the target image, each of the first pixel values comprising a first color value of at least one color channel, the first color value being within a target color value interval of the at least one color channel, and m being a positive integer;
   dividing the target color value interval into n color value partitions, n being a positive integer greater than 1;
   determining a color value partition where the first color value falls from the n color value partitions, and converting the first color value into a second color value according to a position of the first color value in the color value partition, the number of bits occupied by the second color value being less than the number of bits occupied by the first color value,
   wherein converting the first color value into the second color value according to the position of the first color value in the color value partition comprises:
   dividing the color value partition where the first color value falls into h color value sub-intervals, each of the color value sub-intervals corresponding to one second color value, and h being a positive integer greater than 1;
   determining a target color value sub-interval in the h color value sub-intervals, the target color value sub-interval being a color value sub-interval where the first color value falls; and
   acquiring the second color value corresponding to the target color value sub-interval as the second color value converted from the first color value.

2. The method according to claim 1, both the first color value and the second color value are a binary value;
   The number h of color value sub-intervals divided between the one color value partition where the first color value falls satisfies a first formula, wherein the first formula is h=2k, k being the number of bits occupied by the second color value.

3. The method according to claim 1, wherein dividing the color value partition where the first color value falls into the h color value sub-intervals comprises:
   dividing evenly the color value partition where the first color value falls into the h color value sub-intervals.

4. The method according to claim 1, wherein dividing the target color value interval into the n color value partitions comprises:
  determining n−1 gray-scale transition boundaries in the target image according to the image data, a difference between the first color value of the pixel on one side of each of the gray-scale transition boundaries and the first color value of the pixel on the other side of each of the gray-scale transition boundaries being greater than a target difference threshold;
  determining n−1 target endpoints according to the first color value of the pixel contained in each of the gray-scale transition boundaries;
  dividing the target color value interval into the n color value partitions according to the n−1 target endpoints, each of the target endpoints being an endpoint of the color value partition.

5. The method according to claim 4, wherein determining the n−1 gray-scale transition boundaries in the target image according to the image data comprises:
  determining a boundary of a circular image as the gray-scale transition boundary when determining that the target image comprises the circular image according to the image data.

6. The method according to claim 1, the number of bits occupied by the first color value is equal to 8, and the number of bits occupied by the second color value is equal to 2.

7. A device for use in converting image data, comprising:
  a processor; and
  a memory configured to store at least one computer program;
  the processor is configured to execute the at least one computer program stored in the memory to perform the method for converting image data as defined in claim 1, wherein the method for converting image data comprises:
  acquiring image data of a target image, wherein the image data comprises first pixel values of m pixels in the target image, each of the first pixel values comprising a first color value of at least one color channel, the first color value being within a target color value interval of the at least one color channel, and m being a positive integer;
  dividing the target color value interval into n color value partitions, n being a positive integer greater than 1;
  determining a color value partition where the first color value falls from the n color value partitions, and converting the first color value into a second color value according to a position of the first color value in the color value partition, the number of bits occupied by the second color value being less than the number of bits occupied by the first color value,
  wherein converting the first color value into the second color value according to the position of the first color value in the color value partition comprises:
  dividing the color value partition where the first color value falls into h color value sub-intervals, each of the color value sub-intervals corresponding to one second color value, and h being a positive integer greater than 1;
  determining a target color value sub-interval in the h color value sub-intervals, the target color value sub-interval being a color value sub-interval where the first color value falls; and
  acquiring the second color value corresponding to the target color value sub-interval as the second color value converted from the first color value.

8. The device according to claim 7, further comprising a display unit, the display unit comprising m pixel units;
  wherein each of the pixel units comprises a memory, the memory comprised by each of the pixel units being configured to store at least one second pixel value required for display by each of the pixel units, the second pixel value comprising a second color value of at least one color channel, and m being a positive integer.

9. The device according to claim 7, both the first color value and the second color value are a binary value;
  The number h of color value sub-intervals divided between the one color value partition where the first color value falls satisfies a first formula, wherein the first formula is h=2k, k being the number of bits occupied by the second color value.

10. The device according to claim 7, wherein dividing the color value partition where the first color value falls into the h color value sub-intervals comprises:
  dividing evenly the color value partition where the first color value falls into the h color value sub-intervals.

11. The device according to claim 7, wherein dividing the target color value interval into the n color value partitions comprises:
  determining n−1 gray-scale transition boundaries in the target image according to the image data, a difference between the first color value of the pixel on one side of each of the gray-scale transition boundaries and the first color value of the pixel on the other side of each of the gray-scale transition boundaries being greater than a target difference threshold;
  determining n−1 target endpoints according to the first color value of the pixel contained in each of the gray-scale transition boundaries;
  dividing the target color value interval into the n color value partitions according to the n−1 target endpoints, each of the target endpoints being an endpoint of the color value partition.

12. The device according to claim 11, wherein determining the n−1 gray-scale transition boundaries in the target image according to the image data comprises:
  determining a boundary of a circular image as the gray-scale transition boundary when determining that the target image comprises the circular image according to the image data.

13. A computer-readable storage medium storing computer instructions therein, wherein the at least one computer instruction, when being executed by a processor, enables the processor to perform the method for converting image data as defined in claim 1.

* * * * *